United States Patent [19]

Nitschke et al.

[11] Patent Number: 4,572,929
[45] Date of Patent: Feb. 25, 1986

[54] ASSEMBLY FOR THE TRANSMISSION OF ELECTRICAL ENERGY TO VEHICLES

[75] Inventors: Christoph Nitschke, Erlangen; Helmut Wehrberger, Rottenbach; Hermann Menhorn, Molln, all of Fed. Rep. of Germany

[73] Assignee: Siemens Aktiengesellschaft, Munich, Fed. Rep. of Germany

[21] Appl. No.: 461,506

[22] Filed: Jan. 27, 1983

[30] Foreign Application Priority Data

Jan. 29, 1982 [DE] Fed. Rep. of Germany ....... 3202846
Nov. 26, 1982 [DE] Fed. Rep. of Germany ....... 3243933

[51] Int. Cl.$^4$ .......................... B60L 5/39; B60L 5/36; B60M 1/30
[52] U.S. Cl. ..................................... 191/29 R; 191/49
[58] Field of Search ................ 191/22 R, 22 C, 23 R, 191/23 A, 28, 29 R, 30, 31, 32, 45 R, 48, 49

[56] References Cited

U.S. PATENT DOCUMENTS

| | | | |
|---|---|---|---|
| 780,698 | 1/1905 | Anstett | 191/49 |
| 2,086,611 | 7/1937 | Frank | 191/48 X |
| 3,760,913 | 9/1973 | Payen | 191/49 |
| 3,786,204 | 1/1974 | Laurent | 191/48 |
| 3,786,762 | 1/1974 | Corkum et al. | 191/29 R X |
| 3,821,497 | 6/1974 | Laurent | 191/48 X |
| 3,847,256 | 11/1974 | Zurek et al. | 191/49 |
| 4,108,288 | 8/1978 | Manabe et al. | 191/49 |
| 4,155,434 | 5/1979 | Howell, Jr. | 191/22 R |
| 4,234,065 | 11/1980 | Vozumi et al. | 191/29 R |

FOREIGN PATENT DOCUMENTS

| | | | |
|---|---|---|---|
| 2144049 | 3/1973 | Fed. Rep. of Germany | 191/49 |
| 2349152 | 5/1974 | Fed. Rep. of Germany | 191/49 |
| 2730929 | 1/1979 | Fed. Rep. of Germany | 191/30 |

Primary Examiner—Robert B. Reeves
Assistant Examiner—David F. Hubbuch
Attorney, Agent, or Firm—Kenyon & Kenyon

[57] ABSTRACT

An assembly for the transmission of electrical energy to a vehicle comprises two current rails with respective contact surfaces inclined at an angle toward each other in a roof-like arrangement and a current collector having a sliding shoe with a pair of contact surfaces inclined toward each other at the same angle. The sliding shoe is mounted movably on the current collector by means of a ball and socket joint. The support point of the sliding shoe, i.e. the geometrical center of the support ball, is located at least approximately on an imaginary line which connects the centers of gravity of the two contact surfaces of the current rails.

13 Claims, 8 Drawing Figures

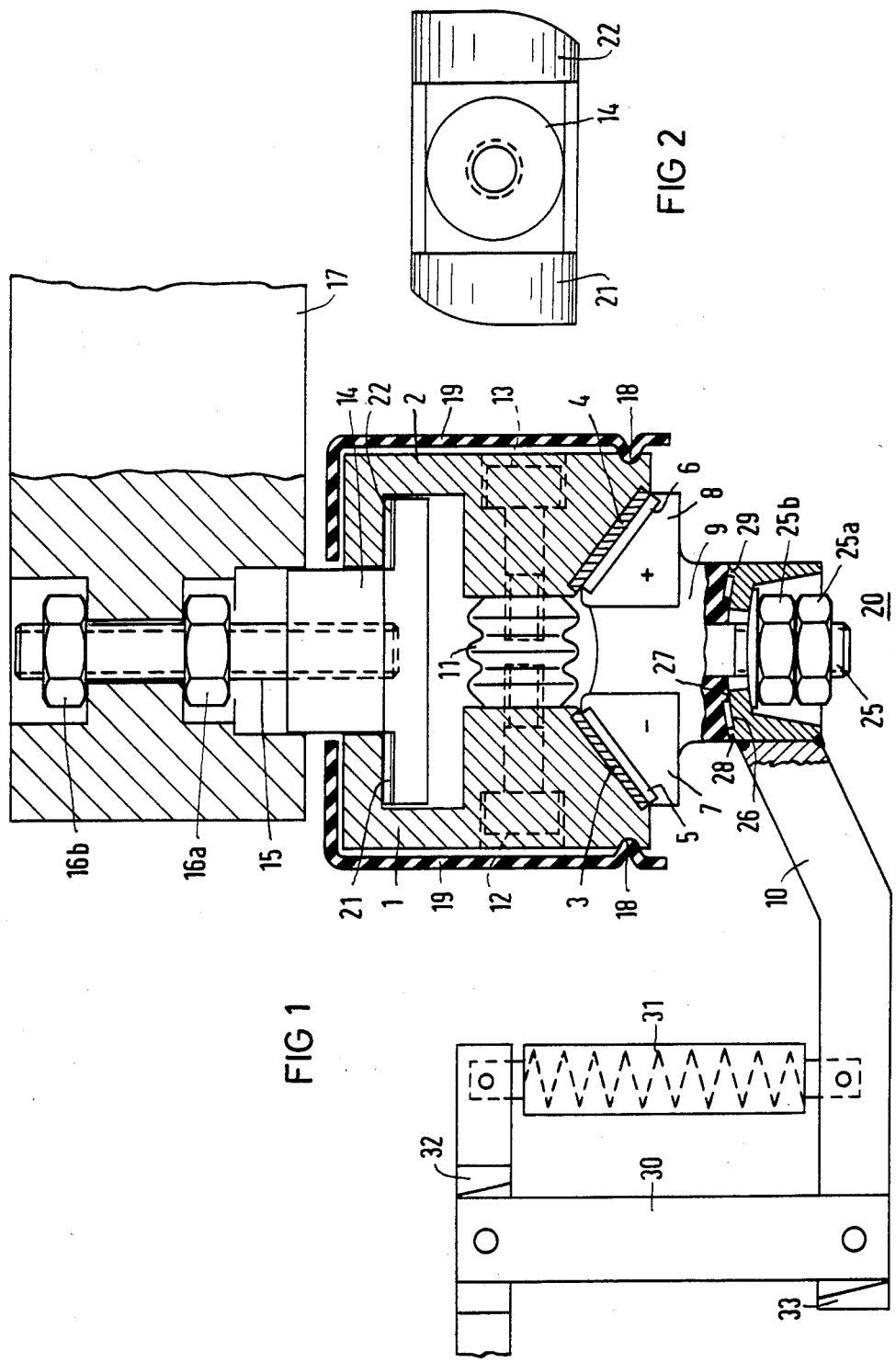

ASSEMBLY FOR THE TRANSMISSION OF ELECTRICAL ENERGY TO VEHICLES

FIELD OF THE INVENTION

This invention relates to the transmission of electrical energy to vehicles by means of current collectors slidably engaging current carrying rails mounted on insulated supports.

In electrical transportation systems having vehicles with lateral current collectors, a current carrying third rail is mounted on third rail supports insulated at predetermined spacings. The third rail is contacted by the current collector either from the top, from the side or from below. The return current is conducted back via a track rail (see the book by Fiedler, "Grundlagen der Bahntechnik" (Fundamentals of Railroad Engineering), 1980, pages 113 and 114).

Electrical transmission assemblies are known, in which several "third" rails are disposed on top of each other (see, e.g., German Pat. No. 26 54 073) and are used with one or more poles for the transmission of energy. The contact surfaces of all such current rails lie in one plane and are contacted from the side. For purposes of safety and protection against weather, especially icing, the current rails are provided with a protective covering.

An object of the invention is to provide an electrical transmission assembly with parallel current rails, in which the motion of the current collector is automatically guided by the contact surfaces of the current rails and equal contact pressure on the sliding surfaces is ensured.

SUMMARY OF THE INVENTION

According to the invention, this object is attained by the provision of two juxtaposed current rails with respective contact surfaces which are inclined at an angle toward each other and which slidingly engage, during operation of a vehicle, respective contact surfaces of a sliding shoe mounted on a current collector of the vehicle, the sliding shoe contact surfaces being inclined toward each other at the angle of inclination of the current rail contact surfaces. The current rails may be arranged side by side or on top of each other.

According to another feature of the invention, the sliding surfaces of the current rails, as well as the contact surfaces of the sliding shoe, are disposed with respect to one another in a roof-like arrangement. If the current rails are arranged side by side, the current can be taken off from below and the contact surfaces are protected particularly well against external influences such as icing and the like, since they form a run-off or dripping edge.

If, in the case of an interruption or break in a current rail, the current collector runs onto a new current rail, a one-sided stress at the running-up side of the sliding surface can occur. In order to avoid an asymmetrical stress caused by canting of the sliding shoe of the run-up and run-down side of the sliding surface, it is advantageous to arrange the sliding contacts with the contact surfaces on the sliding shoe in such a manner that the connecting line of the centers of gravity of the two contact surfaces goes at least approximately through the support point. In this manner, not only tilting of the sliding shoe in the case of an interruption of the current rail is prevented, but in addition, a still more uniform distribution of the sliding forces is obtained by conducting the thrust forces into the sliding zone and thereby improving the current collection.

BRIEF DESCRIPTION OF THE DRAWING

FIG. 1 is a generally cross-sectional view of an assembly for the transmission of electrical energy from two current rails to a vehicle, in accordance with the present invention.

FIG. 2 is a top view of a suspension plate for the current rails shown in FIG. 1.

DETAILED DESCRIPTION

Figure 3:
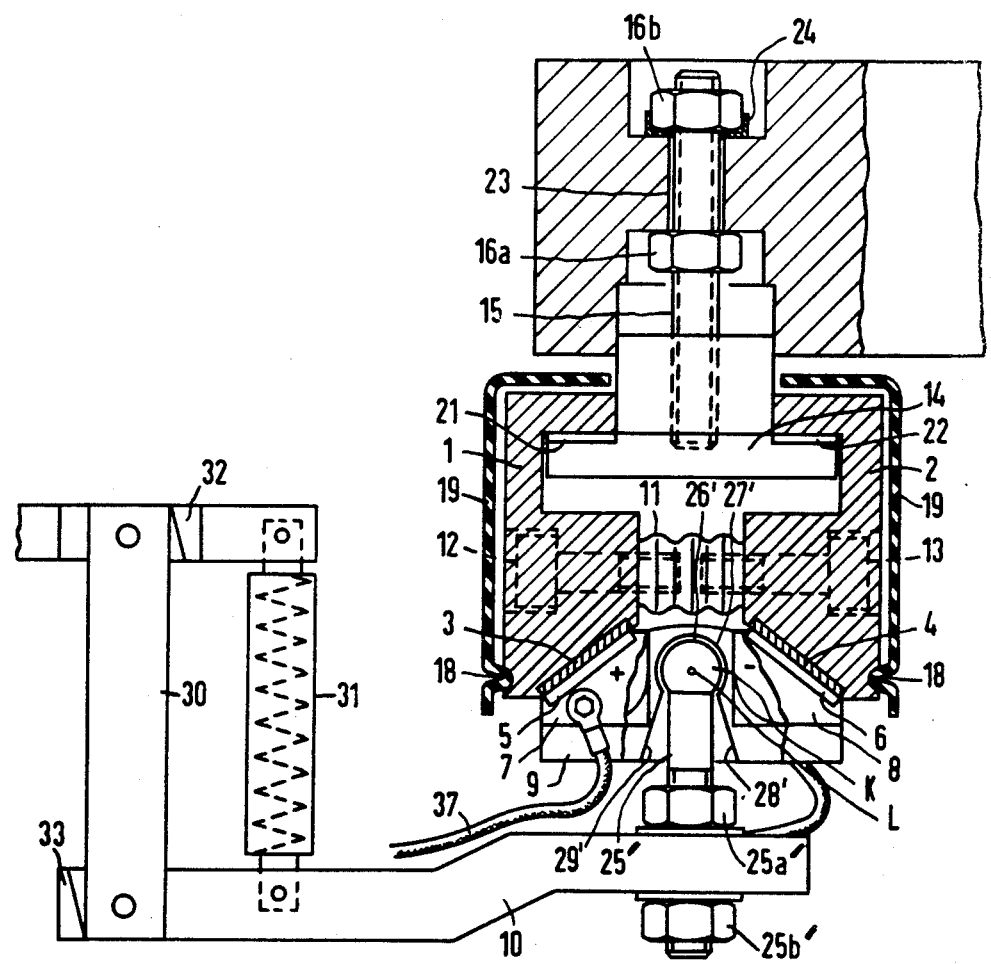
FIG. 3 is a generally cross-sectional view of an assembly, in accordance with the present invention, for the transmission of electrical power from current rails to a vehicle.

As illustrated in FIG. 1, two current rails 1 and 2 have sliding strips or contact surfaces 3 and 4 which are inclined at an angle relative to each other and which engage similarly inclined contact surfaces 5 and 6 of a sliding shoe 9. Contact surfaces 3 and 4 (and 5 and 6) take in profile or cross-section the form of leg segments of an inverted V. Sliding contact surfaces 5 and 6 are arranged on contact carriers 7 and 8. The sliding shoe 9 is rotatably supported on an arm 10 of a current collector 20. Current rails 1 and 2 function as a two-pole energy supply for an electrically driven vehicle and are spaced from each other by an insulator 11. Rails 1 and 2 have the same cross-sectional shape and are detachably connected to insulator 11 via screws 12 and 13. The upper parts of current rails 1 and 2 together have a U-shaped profile and, for a two-pole connection, extend around a suspension plate 14 of insulating material. This suspension plate 14 is fastened via a screw bolt 15, nuts 16a and 16b and a locking plate 24 (see FIG. 3) or the like to a current rail arm 17. Turning nuts 16a and 16b effectuates in a simple manner an adjustment of the vertical position of current rails 1 and 2. Suspension plate 14 is provided with crowned sliding surfaces 21 and 22, rolls (not illustrated) or other sliding bodies to facilitate longitudinal motion, due to temperature variations, of the current rails which are welded together to form greater lengths.

Suspension plate 14, shown in detail in FIG. 2, is introduced with a screw bolt 15 (FIG. 1) between the two current rails 1 and 2 and rotated 90° so that it extends behind the current rails. Rails 1 and 2 can then be raised and screw bolt 15 inserted into a opening 23 of current rail arm 17 and screwed tight by means of nuts 16a and 16b.

Current rails 1 and 2 are provided with respective grooves 18 for enabling the snap lock mounting of a cover 19.

Sliding shoe 9 of current collector 20 is supported flexibly via a vertically extending screw bolt 25 anchored by nuts 25a and 25b at support arm 10 of current collector 20. The shoe can freely move in two coordinate directions relative to arm 10 up to limits imposed by stops 28 and 29 and can rotate about a vertical axis so that in operation of the vehicle, shoe contact surfaces 5 and 6 always fully engage the contact surfaces 3 and 4 of the current rails. Continuous engagement of the current rails contact surfaces and the shoe contact surfaces is implemented by a support of the sliding shoe 9 in the manner of a ball-end suspension, known per se, with curved sliding surfaces 26 and 27.

Support arm 10 is suspended at the vehicle movably via a tie 30. A tension spring 31 attached in parallel to tie 30 provides the necessary contact pressure for sliding shoe 9. To limit the vertical movement of arm 10 in the event, for instance, that a line section without a third rail is traversed, stops 32 and 33 are provided in a manner known per se.

As illustrated in FIG. 3, sliding shoe 9 may be provided with a spherical inner support surface 27' for slidably engaging a spherical outer support surface 26' of a ball-shaped head K of a stud 25'. Sliding contacts 7 and 8 bearing contact surfaces 5 and 6 are disposed on sliding shoe 9 such that an imaginary line defined by the centers of gravity (generally the geometrical centers) of contact surfaces 5 and 6 passes, at least approximately, through the support point L of head K (i.e. the point through which compressive support forces pass). Stud 25' is fastened by means of nuts 25a' and 25b' vertically to arm 10 of current collector 20. Sliding shoe 9 can move freely in two coordinates relative to arm 10 up to stops 28' and 29' and rotate through a small angle about the axis of threaded stud 25' so that contact surfaces 5 and 6 always fully engage contact surfaces 3 and 4 of current rails 1 and 2 during operation of the vehicle. Arm 10 is movably suspended at the vehicle via tie rod 30. A flexible electric cable 37 leads from sliding shoe 9 to the power supply device (not shown) of the vehicle.

Figure 4:
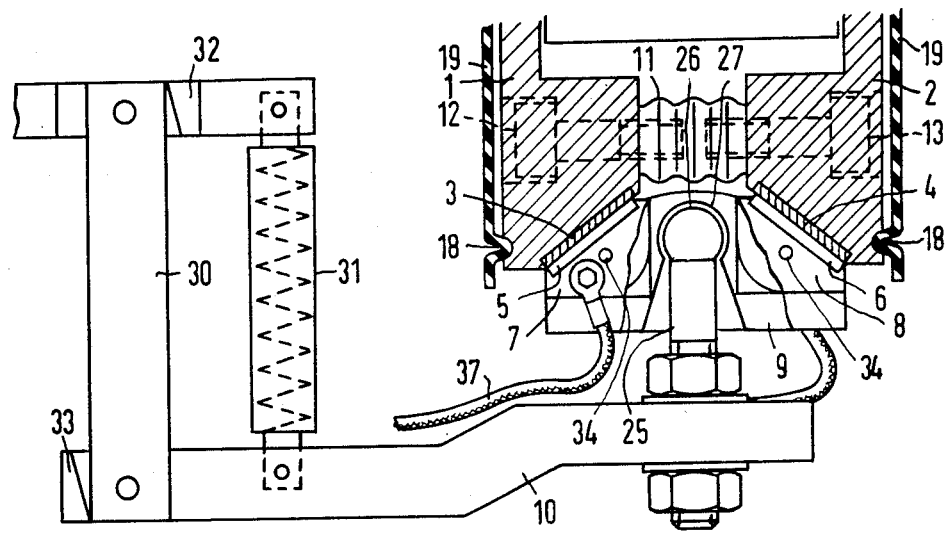
FIGS. 4 and 5 are generally cross-sectional views, similar to FIGS. 1 and 3, of two further assemblies for transmitting electrical power from a pair of current rails to a vehicle, in accordance with the present invention.

In FIG. 4 an arrangement is shown in which sliding contact carriers or members 7 and 8 bearing contact surfaces 5 and 6 are movably mounted on sliding shoe 9. Sliding contact carriers 7 and 8 are advantageously mounted rotatably on sliding shoe 9 by respective axles 34 extending parallel to current rails 1 and 2.

Figure 5:
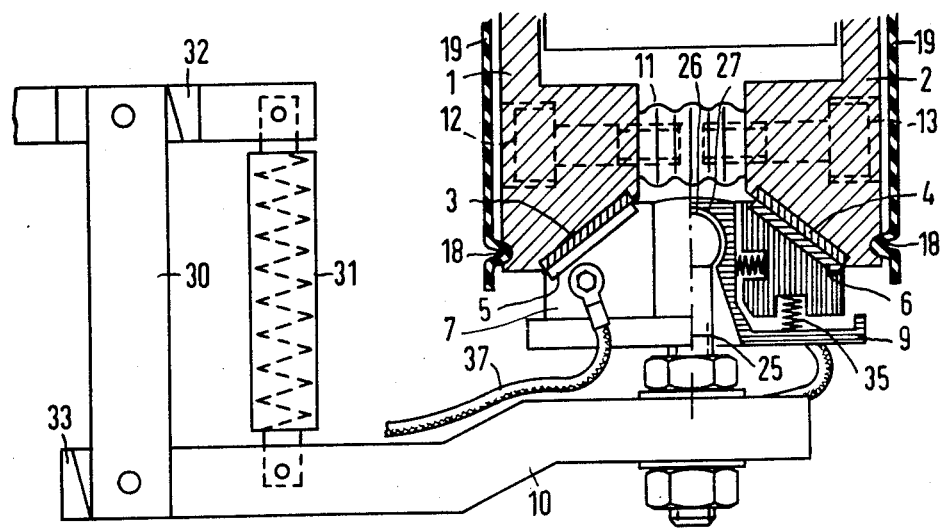

Alternatively, as shown in FIG. 5, contact carriers 7 and 8 may be mounted on sliding shoe 9 by means of springs 35 to facilitate translational motion of contact surfaces in three coordinates. In this manner the sprung mass of the current collector can be kept particularly small.

Figure 6:
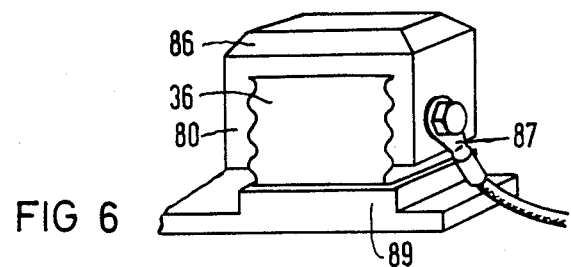
FIG. 6 is a partially broken away perspective view of a contact carrier, in accordance with the present invention, mountable on a current collector of an electrically driven vehicle.

FIG. 6 shows a cubic cup-shaped contact carrier 80 with a sliding contact surface 86. Carrier 80 is placed upside down over a block 36 of elastic material such as rubber. Via this elastic block 36, contact carrier 80 is fastened to a sliding shoe 89 elastically in all directions. A flexible electric line 87 leads from contact carrier 80 to the power supply device of the vehicle.

Figure 7:
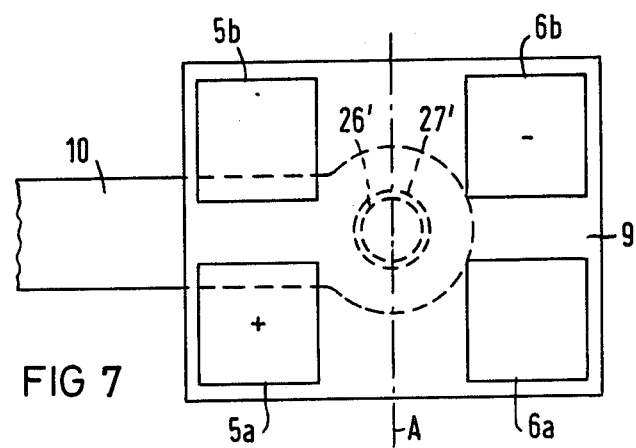
FIG. 7 is a top view of a sliding shoe, according to the present invention, mountable on the current collector of an electrical vehicle.

In order to obtain a high leakage spacing of the current-carrying contact surfaces 5 and 6 of sliding shoe 9 in spite of the compact design of current rails 1 and 2 carrying different potentials, it is advantageous to split the contact surfaces 5 and 6 into contact sections 5a, 5b and 6a, 6b respectively, as illustrated in FIG. 7, contact sections 5a and 5b (and 6a and 6b) being spaced from one another in the direction of the current rail axis A. Of two contact sections 5a and 6a (or 5b and 6b) lying side by side, the one serves as the electric contact 5a or 6b, respectively, and the other as a non-conductive guide contact 6a or 5b, only diametrically or diagonally disposed contact sections 5a and 6b carrying current. In this manner, the leakage current path of sliding shoe 9 is increased without the necessity of increasing the spacing between current rails 1 and 2.

Figure 8:
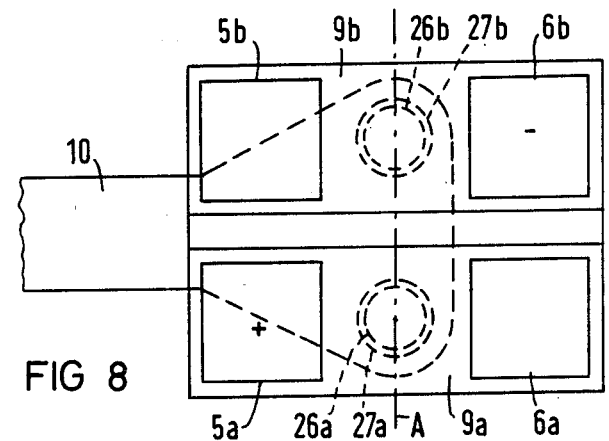
FIG. 8 is a top view, similar to FIG. 7, of a modified sliding shoe in accordance with the present invention.

In the embodiment shown in FIG. 8, the contact sections which lie side by side in pairs are arranged on divided sliding shoes 9a and 9b spaced from another in the direction of axis A and movably mounted on respective ball-headed studs via sliding support surfaces 26a and 27a and 26b and 27b, respectively. This improves the sliding dynamics of the energy transmission assembly considerably.

What is claimed is:

1. In an electrical transportation system wherein a vehicle is driven by electric power available from a pair of current carrying rails mounted on insulator supports, said vehicle having a current collector slidably engaging the rails for tapping current therefrom, the improvement wherein:

the rails are juxtaposed to one another and have respective first contact surfaces inclined at an angle toward one another and forming, in cross section, leg segments of an inverted V and the current collector comprises a sliding shoe with two second contact surfaces inclined toward one another at substantially said angle, said first contact surfaces engaging respective ones of said second contact surfaces during operation of the vehicle in the system, further comprising coupling means for movably mounting said shoe on said current collector to permit at least partial rotation of said shoe about a vertical axis and partial rotation about a pair of horizontal axes lying in the same horizontal plane at an angle with respect to one another, said coupling means having a centrally disposed support point and said second contact surfaces have centers of gravity, said second contact surfaces being disposed on said shoe such that an imaginary line connecting said centers of gravity passes at least approximately through said support point of the sliding shoe.

2. The improvement defined in claim 1, further comprising a pair of contact members each carrying one of said second contact surfaces, said contact members being movably mounted on said shoe.

3. The improvement defined in claim 2 wherein said contact members are rotably mounted on said shoe by means of respective axles extending parallel to said rails during operation of said vehicle.

4. The improvement defined in claim 2 wherein said contact members are shiftably mounted on said shoe by means of springs.

5. The improvement defined in claim 1 wherein said current collector has a support arm extending from said vehicle toward said rails and said coupling means includes a first stud fastened at one end to said support arm and provided at an opposite end with a first curved surface, said shoe being provided with a second curved surface for slidingly engaging said first curved surface to facilitate movement of said shoe during operation of said vehicle.

6. The improvement defined in claim 5 wherein said stud is provided with a ball shaped head at an end opposite said support arm, said first curved surface being a spherical outer surface of said head, said second curved surface being a spherical inner surface of said shoe.

7. The improvement defined in claim 5 wherein each of said second contact surfaces comprises at least two contact sections spaced from one another in the direction of said rails during operation of said vehicle, one of said contact sections being operatively connected to said vehicle for conducting current thereto from one of said rails, the other of said contact sections being nonconductive, the conductive sections of said second contact surfaces being disposed diagonally with respect to one another.

8. The improvement defined in claim 7 wherein said shoe comprises a pair of shoe members spaced from one another in the direction of said rails during operation of said vehicle, each of said second contact surfaces having a contact section disposed on one of said shoe members, said coupling means including an additional stud parallel to said first stud, each of said studs being fastened at one end to said support arm and provided at an opposite end with a ball shaped head with a spherical outer surface, said shoe members each having a spherical inner surface engaging, during operation of said vehicle, a spherical outer surface of a respective one of said shoe members.

9. The improvement defined in claim 1 wherein each of said second contact surfaces comprises at least two contact sections spaced from one another in the direction of said rails during operation of said vehicle, one of said contact sections of each contact surface being operatively connected to said vehicle for conducting current thereto from one of said rails, the other of said contact sections being nonconductive, the conductive sections of said second contact surfaces being disposed diagonally with respect to one another.

10. The improvement defined in claim 9 wherein said shoe comprises a pair of shoe members spaced from one another in the direction of said rails during operation of said vehicle, each of said second contact surfaces having a contact section disposed on one of said shoe members.

11. In a transportation system having an electrically driven vehicle, an assembly for supplying electrical power to said vehicle, comprising:
a pair of current carrying rails juxtaposed to one another and provided with respective first contact surfaces inclined at an angle toward one another;
support means engaging said rails for supporting and electrically insulating same;
current collector means mounted to the vehicle and engageable with said rails for drawing electrical current therefrom and supplying it to said vehicle, said current collector means including a sliding shoe with two second contact surfaces inclined toward one another at substantially said angle, said second contact surfaces slidingly engaging respective ones of said first contact surfaces during operation of said vehicle, each of said second contact surfaces comprising at least two contact portions spaced from one another in the direction of said rails in an operating state of the assembly, one of said contact portions of each of said second contact surfaces being operatively connected to said vehicle for conducting current thereto from one of said rails, the other of said contact portions of each of said second contact surfaces being nonconductive, the conductive portions of said second contact surfaces being disposed diagonally with respect to one another.

12. In an electrical transportation system wherein a vehicle is driven by electric power available from a pair of current carrying rails mounted on insulator supports, said vehicle having a current collector slidably engaging the rails for tapping current therefrom, the improvement wherein:
the rails are juxtaposed to one another and have respective first contact surfaces inclined at an angle toward one another and forming, in cross section, leg segments of an inverted V and the current collector comprises a sliding shoe with two second contact surfaces inclined toward one another at substantially said angle, said first contact surfaces engaging respective ones of said second contact surfaces during operation of the vehicle in the system, further comprising coupling means for movably mounting said shoe on said current collector to permit at least partial rotation of said shoe about a vertical axis and partial rotation about a pair of horizontal axes lying in the same horizontal plane at an angle with respect to one another, said coupling means having a centrally disposed support point and said second contact surfaces have centers of gravity, said second contact surfaces being disposed on said shoe such that an imaginary line connecting said centers of gravity passes at most a small distance from said support point, each of said second contact surfaces comprising at least two contact sections spaced from one another in the direction of said rails during operation of said vehicle, one of said contact sections of each contact surface being operatively connected to said vehicle for conducting current thereto from one of said rails, the other of said contact sections being nonconductive, the conductive sections of said second contact surfaces being disposed diagonally with respect to one another.

13. In an electrical transportaion system wherein a vehicle is driven by electric power available from a pair of current carrying rails mounted on insulator supports, said vehicle having a current collector slidably engaging the rails for tapping current therefrom, the improvement wherein:
the rails are juxtaposed to one another and have respective first contact surfaces inclined at an angle toward one another and the current collector comprises a sliding shoe with two second contact surfaces inclined toward one another at substantially said angle, said first contact surfaces engaging respective ones of said second contact surfaces during operation of the vehicle in the system, each of said second contact surfaces comprising at least two contact sections spaced from one another in the direction of said rails during operation of said vehicle, one of said contact sections of each contact surface being operatively connected to said vehicle for conducting current thereto from one of said rails, the other of said contact sections being nonconductive, the conductive sections of said second contact surfaces being disposed diagonally with respect to one another.

* * * * *